(12) United States Patent
Ekelmans

(10) Patent No.: US 9,039,934 B2
(45) Date of Patent: May 26, 2015

(54) COILED REFORMER CATALYST TUBE FOR COMPACT REFORMER

(75) Inventor: Albertus J. Ekelmans, Houston, TX (US)

(73) Assignee: Air Liquide Process & Construction, Inc., Houston, TX (US)

(*) Notice: Subject to any disclaimer, the term of this patent is extended or adjusted under 35 U.S.C. 154(b) by 1211 days.

(21) Appl. No.: 12/957,724

(22) Filed: Dec. 1, 2010

(65) Prior Publication Data

US 2012/0141364 A1    Jun. 7, 2012

(51) Int. Cl.
| | |
|---|---|
| C01B 3/38 | (2006.01) |
| B01J 12/00 | (2006.01) |
| B01J 8/06 | (2006.01) |
| B01J 19/24 | (2006.01) |

(52) U.S. Cl.
CPC .................. *C01B 3/384* (2013.01); *B01J 8/062* (2013.01); *B01J 12/007* (2013.01); *B01J 19/243* (2013.01); *B01J 2208/00504* (2013.01); *B01J 2219/00038* (2013.01); *B01J 2219/00157* (2013.01); *C01B 2203/0233* (2013.01); *C01B 2203/0811* (2013.01); *C01B 2203/0816* (2013.01)

(58) Field of Classification Search
CPC ............. C01B 3/26; B01J 8/02; B01J 8/0285; B01J 19/24; B01J 19/2475; B01J 8/00; B01J 8/0099
USPC .................. 48/127.9, 196.1; 252/373
See application file for complete search history.

(56) References Cited

U.S. PATENT DOCUMENTS

| | | | |
|---|---|---|---|
| 6,942,767 B1* | 9/2005 | Fazzina et al. | 204/252 |
| 7,500,999 B2* | 3/2009 | Aaron et al. | 48/127.9 |

* cited by examiner

*Primary Examiner* — Stanley Silverman
*Assistant Examiner* — Syed Iqbal
(74) *Attorney, Agent, or Firm* — Justin K. Murray

(57) ABSTRACT

A method for producing a chemical reaction is provided. This method includes providing at least two helical tubes, wherein the helical tubes comprise: a first axis and a second axis; wherein the first axis and the second axis are normal to each other; a cross-sectional shape of a predetermined contour; and an inlet end and an outlet end. The method includes reforming a first gas stream and a second gas stream into a third gas stream in the presence of a catalyst. The method includes surrounding a heat source with the helical tubes are, and operating the tube with an average catalyst temperature of above 500 F. An apparatus for producing a chemical reaction is also provided. This apparatus comprises at least two helical tubes, wherein the helical tubes comprise: a first axis and a second axis; wherein the first axis and the second axis are normal to each other; a cross-sectional shape of a predetermined contour; an inlet end and an outlet end, wherein the helical tubes contain a catalyst capable of reforming a first gas stream and a second gas stream into a third gas stream. The helical tubes are designed to surround a heat source, and the tube operates with an average catalyst temperature of above 500 F.

28 Claims, 7 Drawing Sheets

COILED REFORMER CATALYST TUBE FOR COMPACT REFORMER

BACKGROUND

Endothermic catalytic reactions are generally carried out in reaction spaces constructed in the shape of elongated tubes or pipes which are filled with a bulk particulate catalyst. The process medium to be processed by the endothermic reaction is introduced at one end of the catalytic pipe and discharged at the other end. These systems have the disadvantage of requiring trombones or expansion joints. The proposed system provides a large catalyst tube surface area within a small space, and eliminates the requirement for thermal expansion mechanisms.

SUMMARY

In one embodiment of the present invention, a method for producing a chemical reaction is provided. This method includes providing at least two helical tubes, wherein said helical tubes comprise: a first axis and a second axis; wherein said first axis and said second axis are normal to each other; a cross-sectional shape of a predetermined contour; and an inlet end and an outlet end. The method includes reforming a first gas stream and a second gas stream into a third gas stream in the presence of a catalyst. The method includes surrounding a heat source with said helical tubes are, and operating said tube with an average catalyst temperature of above 500 F.

In another embodiment of the present invention, an apparatus for producing a chemical reaction is provided. This apparatus comprises at least two helical tubes, wherein said helical tubes comprise: a first axis and a second axis; wherein said first axis and said second axis are normal to each other; a cross-sectional shape of a predetermined contour; an inlet end and an outlet end, wherein said helical tubes contain a catalyst capable of reforming a first gas stream and a second gas stream into a third gas stream. The helical tubes are designed to surround a heat source, and the tube operates with an average catalyst temperature of above 500 F.

The heat source may be a hot gas stream. The hot gas stream may be the product of an upstream combustion process. The heat source may be a flame. The flame may be from a reformer burner. The helical tubes may be designed to surround the flame from a reformer burner without the presence of any impingent preventing heat shielding. The first gas stream may be a hydrocarbon-containing stream and the second gas stream is steam. The third product gas stream may be a hydrogen containing stream.

In another embodiment of the present invention, a reactor catalytic apparatus, comprising at least two helical tubes disposed within a reaction zone, wherein said helical tubes contain a catalytic means is provided. The helical tube may be in fluid communication with a heat source. The heat source may be a hot gas stream. The hot gas may be the product of an upstream combustion process. The heat source may be a flame. The flame may be from a reformer burner. The helical tubes may be designed to surround the flame from a reformer burner without the presence of any impingent preventing heat shielding, In another embodiment of the present invention, a reaction zone for subjecting a first gas and a second gas to a chemical reaction to produce a third gas, the reactor zone comprising at least two spiral tubes in accordance with the above embodiments is provided. This reaction zone includes an inlet port for receiving the first gas and the second gas; a means for directing the first gas and the second gas from the inlet port to the inlet ends of the spiral tubes; an outlet port for discharging the third gas; a means for directing the third gas from the outlet ends of the spiral tubes to the outlet port, and at least one reformer burner (besides burners do we want to include other sources of heat like coal or other fuel source) to produce a flame, wherein indirect heat exchange between the first gas and the second gas, promoted by the catalyst, generates the third gas.

The first gas stream may be a hydrocarbon-containing stream and the second gas stream may be steam. The third product gas stream may be a hydrogen containing stream. The helical tubes may be in the shape of a cylindrical helix, a conical frustum, or a combination of the two. The helical tubes have a shape that approximates the contour of a stable flame, or that allows for an approximately consistent thermal flux.

DESCRIPTION OF PREFERRED EMBODIMENTS

Figure 1:
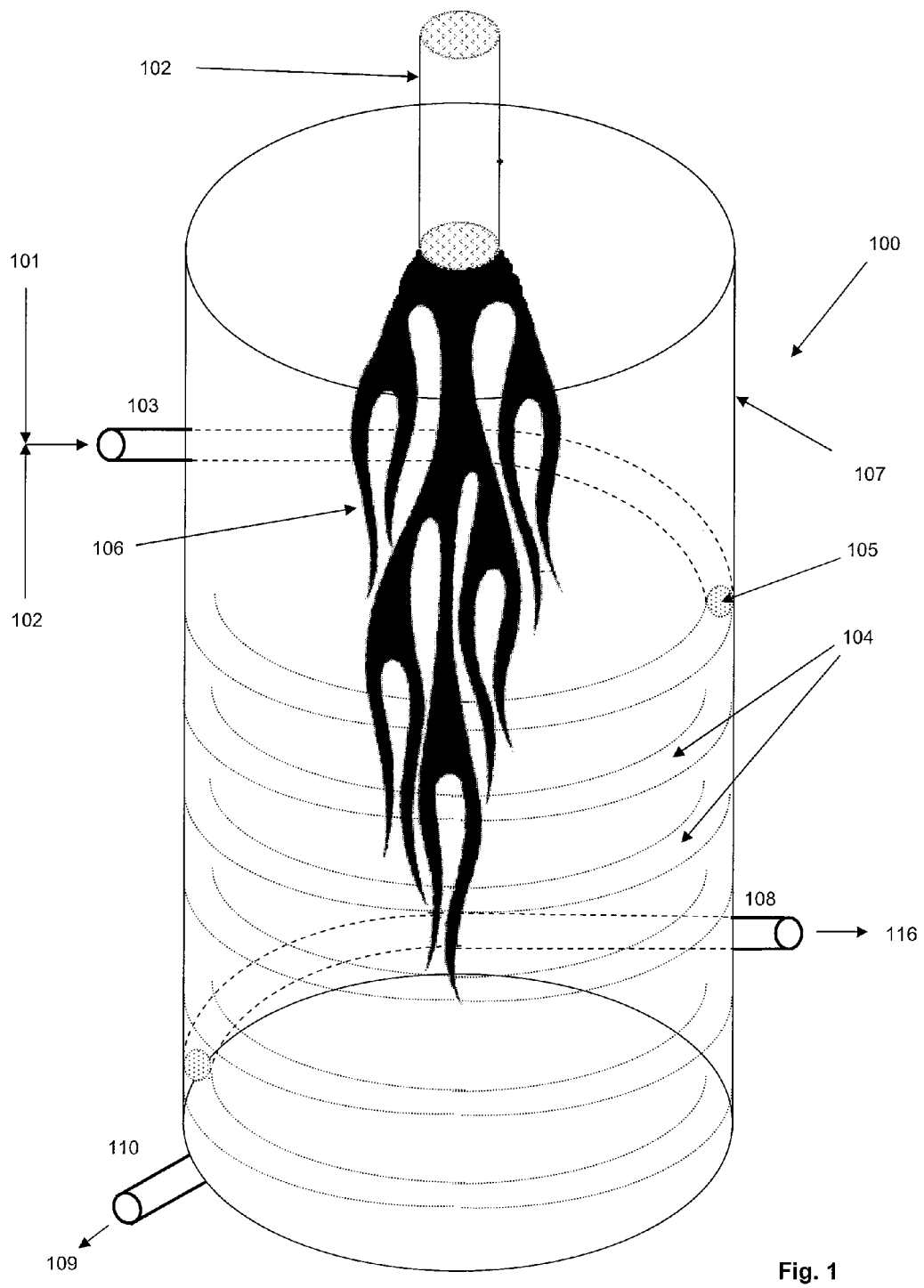
FIG. 1 illustrates an overall representation of one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and timeconsuming, but would nevertheless be a routine undertaking for those of ordinary skill in the art having the benefit of this disclosure.

Figure 2:
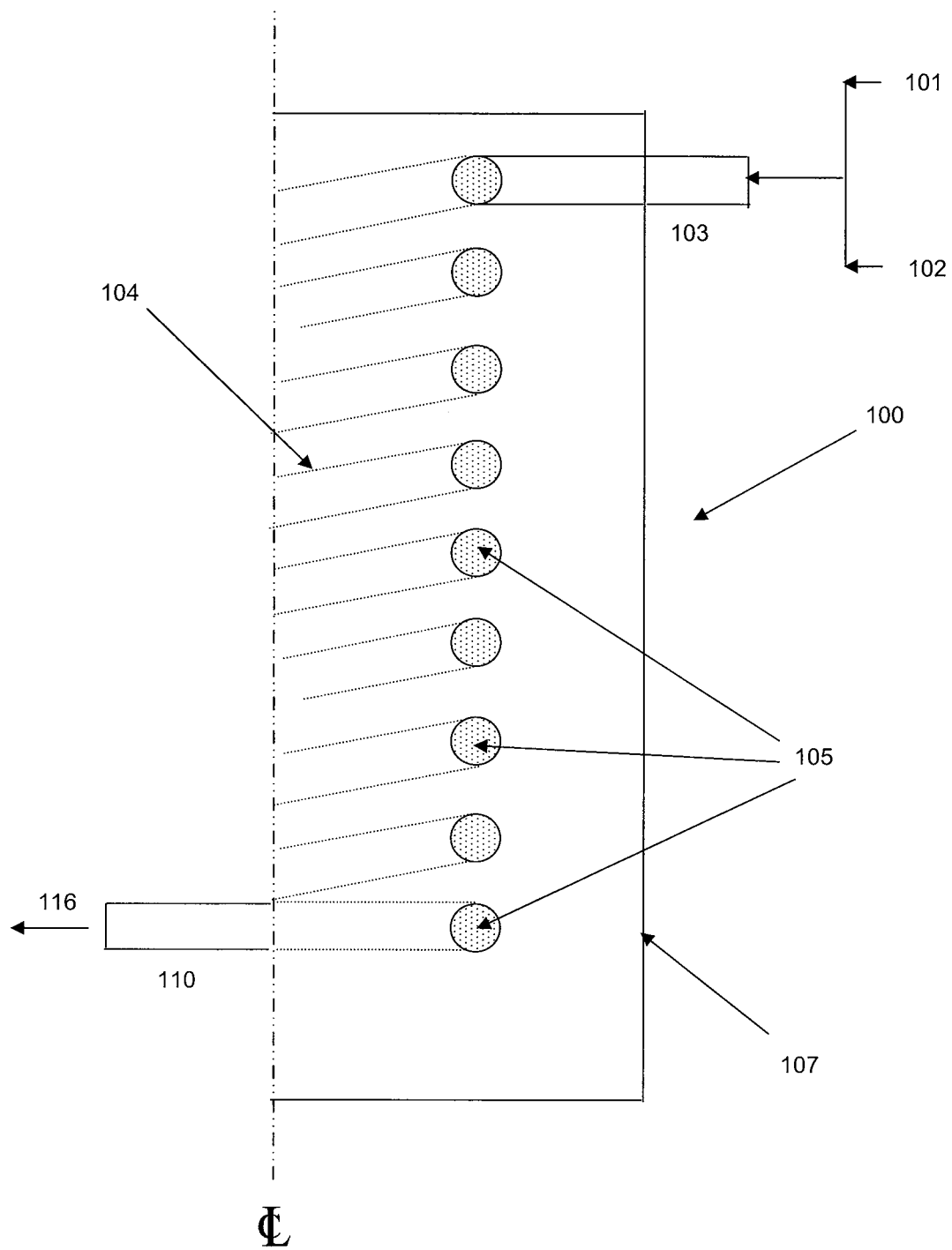
FIG. 2 illustrates a cross-sectional view of the spatial relationship of first coiled convective heating device with respect to vessel, in one embodiment of the present invention.

Turning now to FIGS. 1 and 2, the invention is a coiled reformer catalyst tube for a compact reformer 100. In the interest of convenience and clarity, the elements maintain a consistent numbering scheme throughout all figures.

In overview, in one embodiment of the present invention, a first gas stream 101 and a second gas stream 102 combine to form a reformate inlet gas, which is introduced into a spiral tube 104 by means of conduit 103. There are at least two spiral tubes 104 present inside vessel 107, but only one is graphically indicated in the interest of clarity. The reformat inlet gas is split into as many subordinate feed streams as necessary, so that each individual spiral tube 104 receives a stream. Spiral tube 104 contains a catalyst 105. Heat is utilized by gas stream 101 and gas stream 102, along with the catalyst 105 in spiral tube 104, to produce the third gas stream 116. The required heat is provided by gas stream 106. Hot gas stream 106 may be a flame, or a hot combustion product stream from an upstream process. The hot gas stream 106 is introduced into vessel 107 by means of first conduit 102. The reformate inlet gas encounters hot catalyst 105 thereby producing a third gas stream 116. The third gas stream 116 then exits vessel 107 by means of conduit 108. As there are at least two tubes, there will be at least two third gas streams 116 exiting vessel 107, but as indicated above, only one is indicated graphically in the interest of clarity. The cooled hot gas stream 109, or the combustion products from a burner flame 109, then exits vessel 107 by means of conduit 110.

Figure 3:
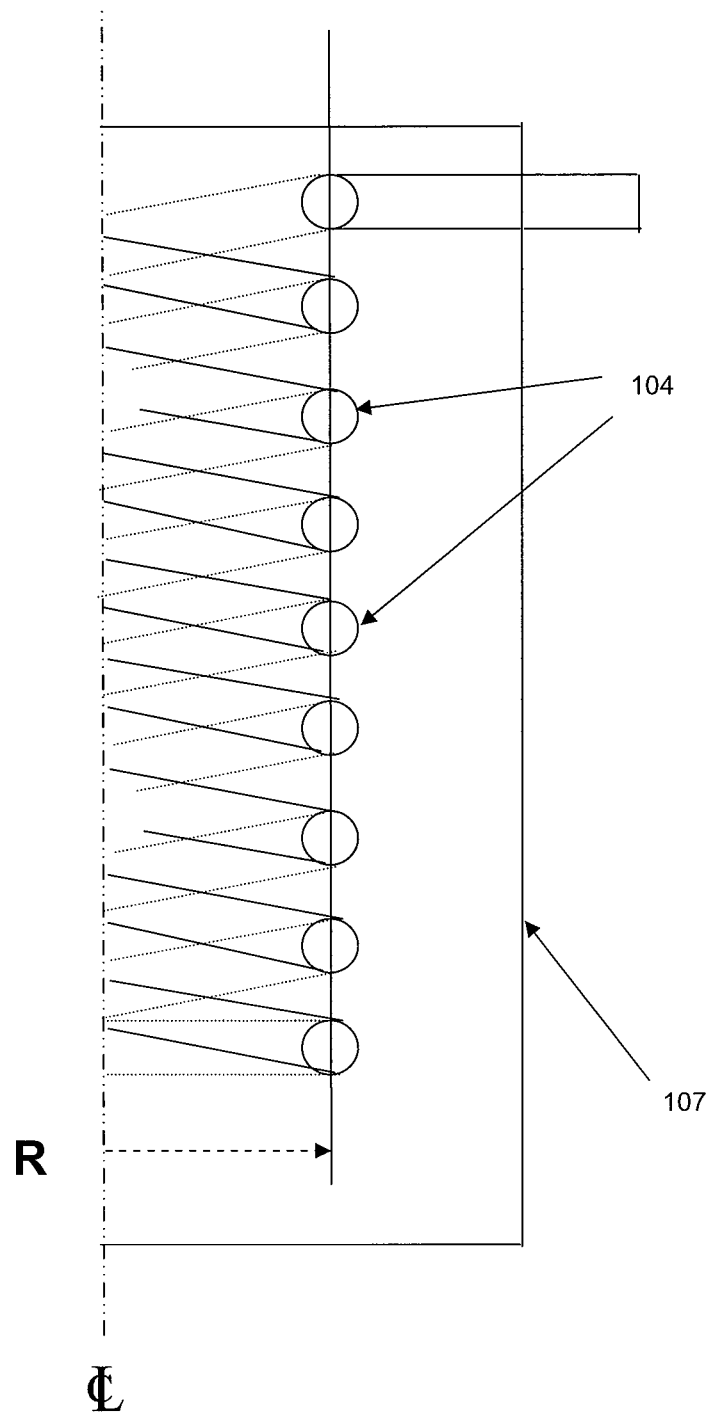
FIG. 3 illustrates a cross-sectional view of the spatial relationship of first coiled convective heating device with respect to vessel, in which the contour of the coil is that of a cylindrical helix, in one embodiment of the present invention.

As indicated in FIGS. 3-6, the cross-sectional shape of spiral tube 104 may be varied according to manufacturing ease and cost, thermodynamic effectiveness or other considerations. FIG. 3 indicates a spiral tube 104 with the shape of a cylindrical helix. In such a configuration, the mean diameter R of the spiral tube is a constant. Such a configuration would be the easiest and most cost effective to manufacture. However the heat transfer will vary along the length, and therefore the overall thermodynamic efficacy will suffer.

Figure 4:
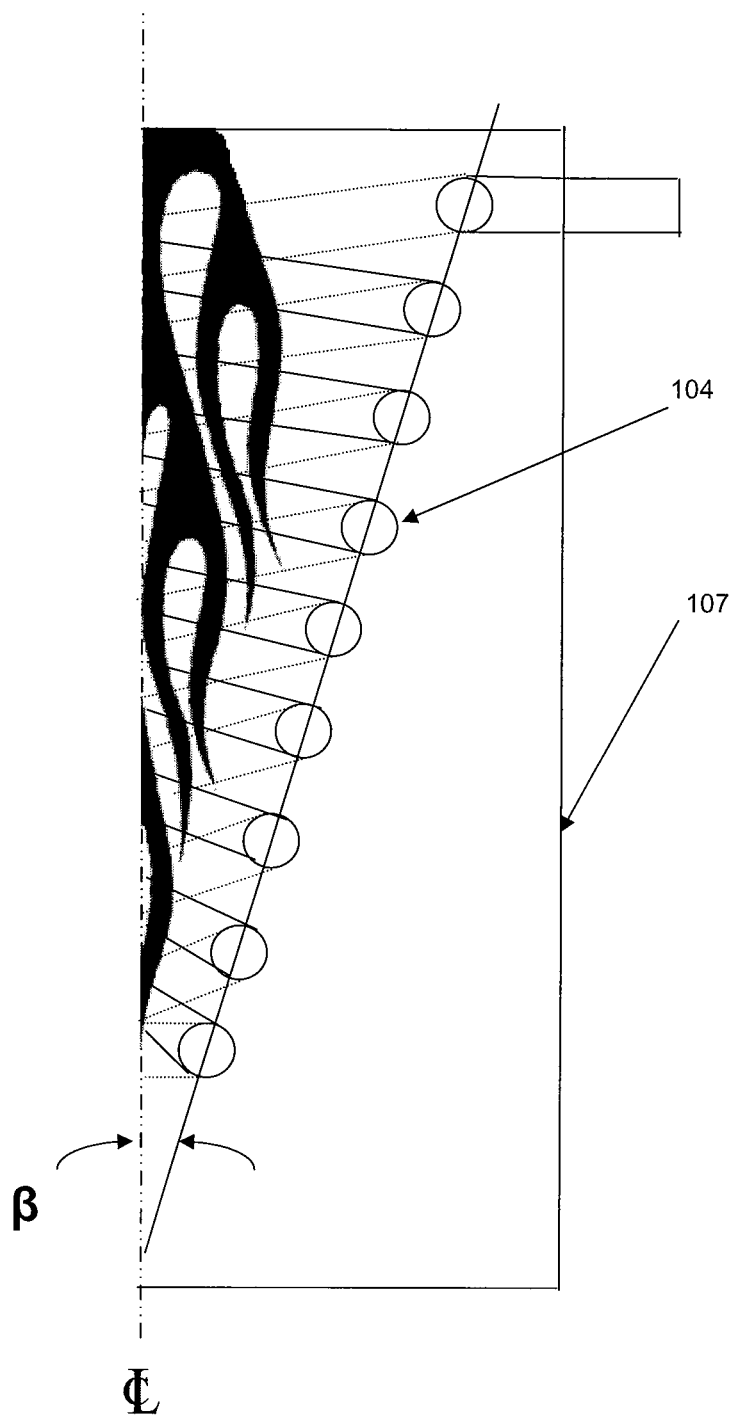
FIG. 4 illustrates a cross-sectional view of the spatial relationship of first coiled convective heating device with respect to vessel, in which the contour of the coil is that of a conical frustum, in one embodiment of the present invention.
Figure 5:
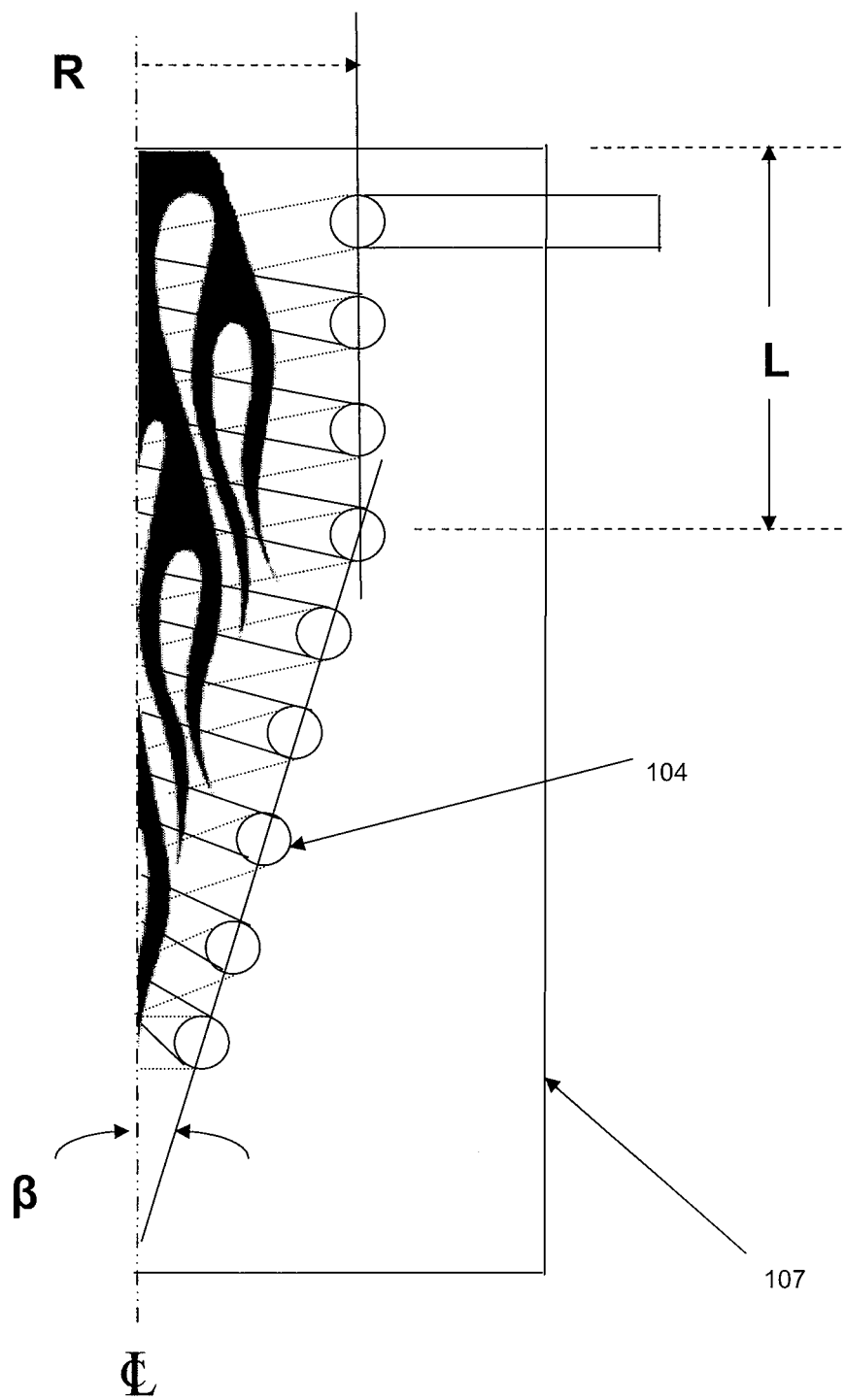
FIG. 5 illustrates a cross-sectional view of the spatial relationship of first coiled convective heating device with respect to vessel, in which the contour of the coil is that of a hybrid cylindrical helix and a conical frustum, in one embodiment of the present invention

FIGS. 4 and 5 indicate a spiral tube 104 with the shape of a conical frustum (FIG. 4), or a conical frustum appended to a cylindrical helix (FIG. 5). In the case of the conical frustum configuration, the mean diameter R is progressively reduced at a constant rate. The cross-sectional profile may be defined by angle $\beta$, which may be determined by the skilled artisan without undue experimentation by means of any number of commercially available software programs. In the case of the hybrid conical frustum/cylindrical helix configuration, the mean diameter R of the spiral tube is a constant for a predetermined length L, of the vessel 107, at which point the mean diameter R is progressively reduced at a constant rate. As above, the angle $\beta$ may be determined without undue experimentation. Such configurations would be somewhat easy and cost effective to manufacture, but not as much so as the configuration in FIG. 3. However in this configuration, the heat transfer will vary less along the length, and therefore the overall thermodynamic efficacy will suffer less.

Figure 6:
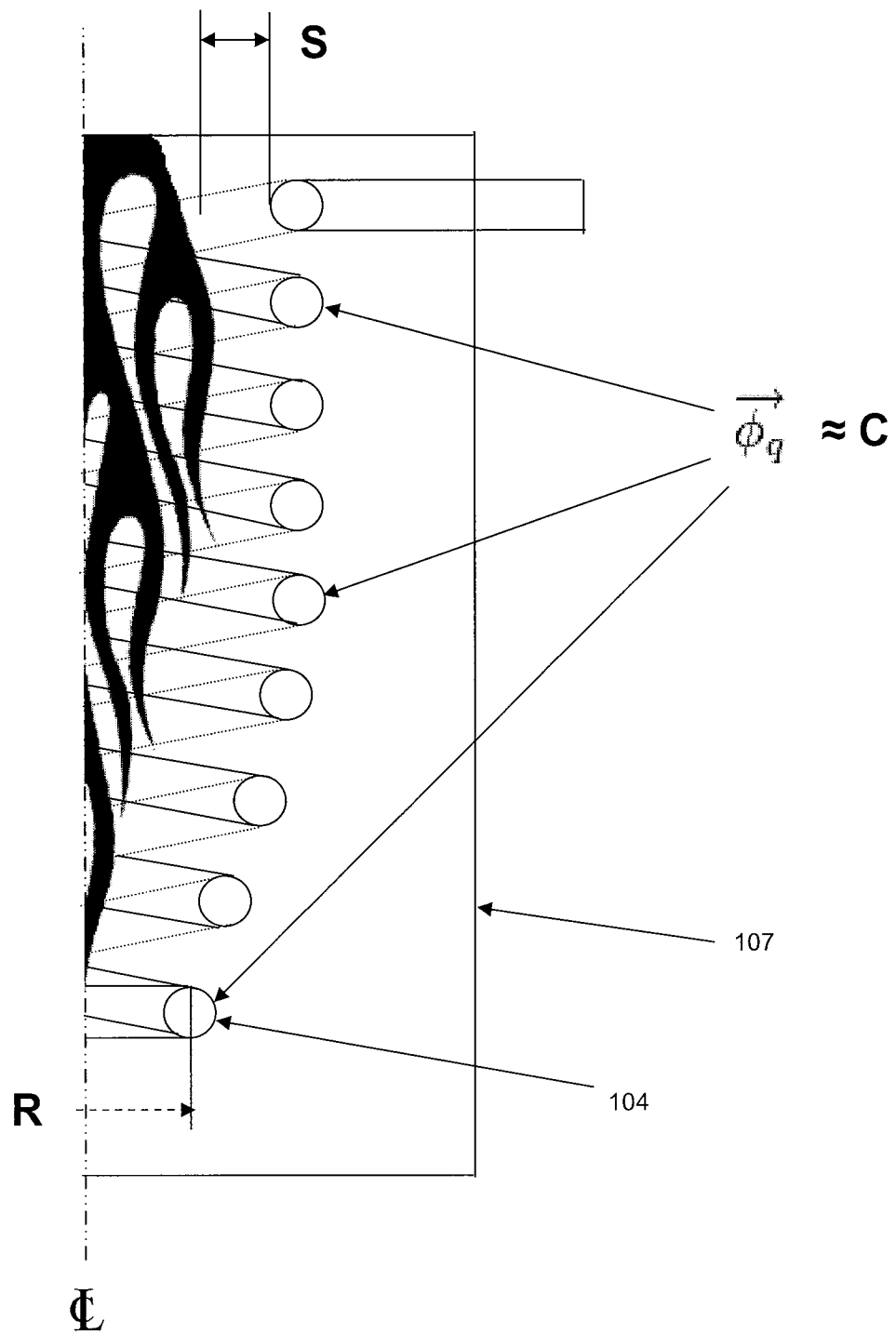
FIG. 6 illustrates a cross-sectional view of the spatial relationship of first coiled convective heating device with respect to vessel, in which the contour of the coil is such as to allow an approximately constant thermal flux along the length of the tube, in one embodiment of the present invention.

FIG. 6 indicates a spiral tube 104 with a shape which allows the thermal flux ($\vec{\phi}_q$) to be approximately constant for the entire length of the vessel 107. In such a configuration, the mean diameter R will vary as will the mean spacing S between the outer zone (zone of complete combustion) of the flame. The outer zone may be taken to be the luminous or non-luminous zones, as seen fit by the skilled artisan in determining the final shape of spiral tube 104. As it is well known, and well understood, that even a stable flame will have considerable variations in the special contours of the outer zone itself, the skilled artisan, without undue experimentation, will have to determine a mean (or root mean square) region in which the thermal flux at each point along the tubes will be as consistent as possible. Such a configuration would not be the easiest and most cost effective to manufacture. However, ideally, the heat transfer will not vary (or not vary meaningfully) along the length, and therefore the overall thermodynamic efficacy will be the highest.

Figure 7:
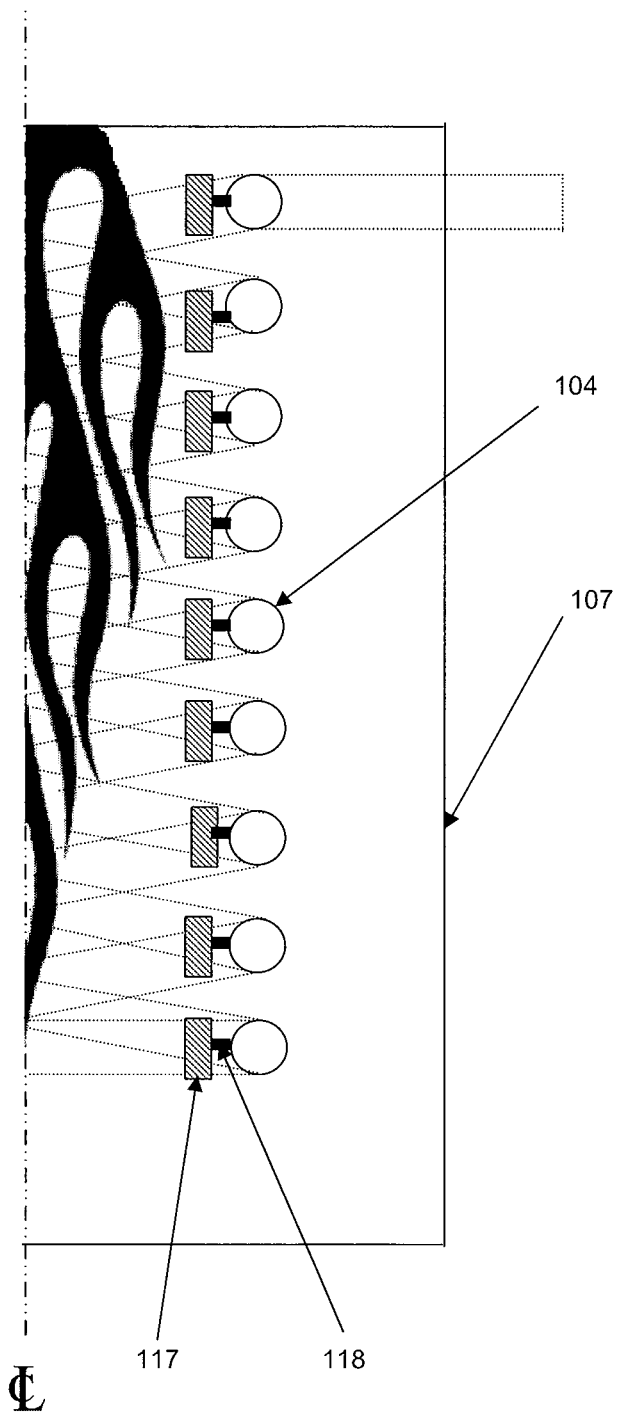
FIG. 7 illustrates a cross-sectional view of the spatial relationship of first coiled convective heating device with respect to vessel, indicating one arrangement of impingement shielding, in one embodiment of the present invention

FIG. 7 indicates the possible placement of impingent preventing heat shielding 117. This heat shielding may be refractory, high alloy metal, or any other composition known to the art. As indicated, heat shielding 117 is not a continuous barrier, but may be a spiral strip of material that is either continuously or intermittently attached to the tubes by any mechanical means known to the skilled artisan 118.

In one embodiment of the present invention, a method for producing a chemical reaction is provided. This method includes providing at least two helical tubes, wherein said helical tubes comprise: a first axis and a second axis; wherein said first axis and said second axis are normal to each other; a cross-sectional shape of a predetermined contour; and an inlet end and an outlet end. The method includes reforming a first gas stream and a second gas stream into a third gas stream in the presence of a catalyst. The method includes surrounding a heat source with said helical tubes are, and operating said tube with an average catalyst temperature of above 500 F.

In another embodiment of the present invention, an apparatus for producing a chemical reaction is provided. This apparatus comprises at least two helical tubes, wherein said helical tubes comprise: a first axis and a second axis; wherein said first axis and said second axis are normal to each other; a cross-sectional shape of a predetermined contour; an inlet end and an outlet end, wherein said helical tubes contain a catalyst capable of reforming a first gas stream and a second gas stream into a third gas stream. The helical tubes are designed to surround a heat source, and the tube operates with an average catalyst temperature of above 500 F.

The heat source may be a hot gas stream. The hot gas stream may be the product of an upstream combustion process. The heat source may be a flame. The flame may be from a reformer burner. The helical tubes may be designed to surround the flame from a reformer burner without the presence of any impingent preventing heat shielding. The first gas stream may be a hydrocarbon-containing stream and the second gas stream is steam. The third product gas stream may be a hydrogen containing stream.

In another embodiment of the present invention, a reactor catalytic apparatus, comprising at least two helical tubes disposed within a reaction zone, wherein said helical tubes contain a catalytic means is provided. The helical tube may be in fluid communication with a heat source. The heat source may be a hot gas stream. The hot gas may be the product of an upstream combustion process. The heat source may be a flame. The flame may be from a reformer burner. The helical tubes may be designed to surround the flame from a reformer burner without the presence of any impingent preventing heat shielding, In another embodiment of the present invention, a reaction zone for subjecting a first gas and a second gas to a chemical reaction to produce a third gas, the reactor zone comprising at least two spiral tubes in accordance with the above embodiments is provided. This reaction zone includes an inlet port for receiving the first gas and the second gas; a means for directing the first gas and the second gas from the inlet port to the inlet ends of the spiral tubes; an outlet port for discharging the third gas; a means for directing the third gas from the outlet ends of the spiral tubes to the outlet port, and at least one reformer burner (besides burners do we want to include other sources of heat like coal or other fuel source) to produce a flame, wherein indirect heat exchange between the first gas and the second gas, promoted by the catalyst, generates the third gas.

The first gas stream may be a hydrocarbon-containing stream and the second gas stream may be steam. The third product gas stream may be a hydrogen containing stream. The helical tubes may be in the shape of a cylindrical helix, a conical frustum, or a combination of the two. The helical tubes have a shape that approximates the contour of a stable flame, or that allows for an approximately consistent thermal flux.

What is claimed is:

1. A compact reformer reactor for steam methane reforming comprising:
   a vessel having an inner volume;
   a burner configured to produce a flame and provide heat to the inner volume by combusting a fuel source in the presence of oxygen;
   a convective coil disposed within the reaction zone, the convective coil configured to absorb heat within the reaction zone, the convective coil having an inlet, an outlet, a cross-sectional shape of a predetermined contour, and a height, wherein the predetermined contour is selected from the group consisting of a conical frustum, a stable flame, and a hybrid cylindrical helix/conical frustum;
   a catalyst disposed within the convective coil, the catalyst configured to enhance a reforming reaction; and
   a combustion gas outlet in fluid communication with the inner volume, the combustion gas outlet located at a point distal the burner.

2. The compact reformer reactor as claimed in claim 1, wherein the convective coil is disposed within the vessel such that the burner is aligned with the vertical axis of the convective coil.

3. The compact reformer reactor as claimed in claim 1, wherein the inlet of the convective coil is nearer the burner than the outlet of the convective coil.

4. The compact reformer reactor as claimed in claim 1, wherein the convective coil has a substantially constant mean diameter about the vertical axis of the convective coil.

5. The compact reformer reactor as claimed in claim 1, wherein the convective coil has a mean diameter about the vertical axis of the convective coil that is reduced along the height of the convective coil, such that thermodynamic efficacy is improved as compared with a convective coil having a substantially constant mean diameter about the vertical axis of the convective coil.

6. The compact reformer reactor as claimed in claim 5, wherein the mean diameter is reduced at a constant rate.

7. The compact reformer reactor as claimed in claim 1, wherein the convective coil has a substantially constant mean diameter about the vertical axis of the convective coil for a first portion of the height of the convective coil, and wherein the mean diameter of the convective coil is progressively reduced for a second portion of the height of the convective coil, such that thermodynamic efficacy is improved as compared with a convective coil having a substantially constant mean diameter along the entire height of the convective coil.

8. The compact reformer reactor as claimed in claim 1, the convective coil comprises a cross sectional profile configured to allow for a thermal flux to be approximately constant about the entire height of the convective coil.

9. The compact reformer reactor as claimed in claim 1, wherein the vessel is substantially cylindrical.

10. The compact reformer reactor as claimed in claim 1, wherein the predetermined contour approximates a cylindrical helix.

11. The compact reformer reactor as claimed in claim 1, wherein the predetermined contour approximates a conical frustum.

12. The compact reformer reactor as claimed in claim 1, wherein the predetermined contour approximates the contour of a stable flame from the burner.

13. The compact reformer reactor as claimed in claim 1, wherein the predetermined contour approximates a hybrid cylindrical helix/conical frustum.

14. The compact reformer reactor as claimed in claim 1, further comprising an absence of trombones or expansion joints.

15. A method for reforming a gas comprising methane, the method comprising the steps of
   obtaining the compact reformer reactor as claimed in claim 1;
   introducing the gas comprising methane into the inlet of the convective coil;
   providing heat to the inner volume by combusting a fuel source in the presence of oxygen to form a combustion gas;
   reacting the methane in the presence of steam to produce a reforming gas comprising hydrogen and carbon monoxide;
   withdrawing the reforming gas at the outlet of the convective coil;
   withdrawing the combustion gas from the inner volume via the combustion gas outlet.

16. The method as claimed in claim 15, wherein the convective coil is disposed within the vessel such that the burner is aligned with the vertical axis of the convective coil.

17. The method as claimed in claim 15, wherein the inlet of the convective coil is nearer the burner than the outlet of the convective coil.

18. The method as claimed in claim 15, wherein the convective coil has a substantially constant mean diameter about the vertical axis of the convective coil.

19. The method as claimed in claim 15, wherein the convective coil has a mean diameter about the vertical axis of the convective coil that is reduced along the height of the convective coil, such that thermodynamic efficacy is improved as compared with a convective coil having a substantially constant mean diameter about the vertical axis of the convective coil.

20. The method as claimed in claim 19, wherein the mean diameter is reduced at a constant rate.

21. The method as claimed in claim 15, wherein the convective coil has a substantially constant mean diameter about the vertical axis of the convective coil for a first portion of the height of the convective coil, and wherein the mean diameter of the convective coil is progressively reduced for a second portion of the height of the convective coil, such that thermodynamic efficacy is improved as compared with a convective coil having a substantially constant mean diameter along the entire height of the convective coil.

22. The method as claimed in claim 15, the convective coil comprises a cross sectional profile configured to allow for a thermal flux to be approximately constant about the entire height of the convective coil.

23. The method as claimed in claim 15, wherein the vessel is substantially cylindrical.

24. The method as claimed in claim 15, wherein the predetermined contour approximates a cylindrical helix.

25. The method as claimed in claim 15, wherein the predetermined contour approximates a conical frustum.

26. The method as claimed in claim 15, wherein the predetermined contour approximates the contour of a stable flame from the burner.

27. The method as claimed in claim 15, wherein the predetermined contour approximates a hybrid cylindrical helix/conical frustum.

28. The method as claimed in claim 15, further comprising an absence of trombones or expansion joints.

* * * * *